Patented Mar. 14, 1939

2,150,759

UNITED STATES PATENT OFFICE 2,150,759

INSECTICIDAL AND FUNGICIDAL COMPOSITIONS

Roscoe H. Carter, Washington, D. C., dedicated to the free use of the Public in the territory of the United States of America No Drawing. Application January 28, 1938, Serial No. 187,563

4 Claims. (Cl. 167—22)

(Granted under the act of March 3, 1883, as amended April 30, 1928; 370 O. G. 757)

This application is a continuation in part of my former application, Serial Number 125,276, filed February 11, 1937, is made under the act of March 3, 1883, as amended by the act of April 30, 1928, and the invention herein described, if patented, may be manufactured and used by or for the Government for governmental purposes without the payment to me of any royalty thereon.

I hereby dedicate the invention herein described to the free use of the Public in the territory of the United States of America to take effect upon the granting of a patent to me.

This invention relates to compositions useful in the control of fungous diseases of plants and trees, more particularly the fungous diseases affecting deciduous fruit trees such as apple and pear but the compositions herein described are not necessarily restricted to such applications. It also relates to methods of preparing such compositions. This invention also relates to compositions useful as insecticides.

The majority of compounds in use at the present time as fungicides contain either copper or sulfur. One of the objects of this invention is to provide new and improved compositions containing both of these elements in such combination that they are insoluble in water but in suitable condition to be applied as sprays and dusts to plant and insect surfaces. Another object of this invention is to furnish improved compositions containing sulfur compounds useful as insecticides.

A study of the chemistry of the compounds in which copper and sulfur may both be present indicated that the copper salts of the xanthic acids might offer some promise along this line. Their theoretical copper and sulfur content are in almost the same percentage, their molecular weights in cuprous xanthates being in the ratio of 63.57 to 64.12 and they also offer the possibility of including an organic radicle which might have value.

The alkali metal salts of xanthic acids have been known for many years and various processes for their preparation have been published.

The general reaction is as follows:

$$ROH + CS_2 + KOH \rightarrow KS_2COR + H_2O$$

In the formation of xanthates, ROH generally refers to an alcohol, but it is possible to form xanthates of other materials, as for instance, cellulose, sugar, saccharides, glycol, glycerin, etc. The alkali metal xanthates are, in general, soluble in water.

Aqueous solutions of alkali metal xanthates when treated with cuprous salts undergo reactions forming insoluble cuprous xanthates.

$$KS_2COR + CuCl \rightarrow CuS_2COR + KCl$$

With cupric salts the final products of reaction are cuprous xanthate and the also insoluble bis alkyl xanthogen or dixanthogen and perhaps small amounts of other impurities.

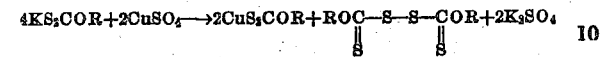

When a solution of cupric salt is allowed to react with a solution of an alkali metal xanthate, in the ratio of 2 mols of cupric salt to 4 mols of alkali metal xanthate, the insoluble reaction products consist, principally, of cuprous xanthate and the dialkyl xanthogen in the ration of 2 mols to 1 mol. Thus when 2 mols of cupric sulfate ($CuSO_4.5H_2O$) have reacted with 4 mols of potassium ethyl xanthate ($KSCSOC_2H_5$) the reaction products consist principally of 2 mols of water insoluble cuprous ethyl xanthate and 1 mol of water insoluble diethyl xanthogen, intimately mixed, and 2 mols of water soluble potassium sulfate. The cuprous xanthate is a solid material and the diethyl xanthogen which is normally a liquid does not however separate but remains absorbed or intimately associated with the cuprous xanthate. A similar reaction also takes place when alkyl xanthates other than potassium ethyl xanthate are used forming the cuprous alkyl xanthate and the dialkyl xanthogen of the particular alkyl radicle used, i. e. methyl, ethyl, propyl, butyl, amyl, and so forth. These insoluble compounds may be filtered off, washed and dried, and if desired the dixanthogen may be separated from the copper salt by the use of organic solvents such as acetone, in which the dixanthogen is soluble. The dixanthogen may then be recovered by evaporation of the solvent. If desired, cupric salts such as the sulfate may be first reduced to the cuprous by the use of sodium sulfite, sulfur dioxide and other suitable reagents and then the reaction proceeds without the formation of the dixanthogen. I have found however that the insoluble products of the reactions between cupric salts and alkali metal xanthates may be used as insecticides and fungicides without separation into the different components, and that this mixture of the reaction products possesses distinct advantages over the separate constituents.

I have prepared in the laboratory by all of these methods the copper salts of the xanthic acids of methyl, ethyl, propyl, butyl, amyl, hexyl, octyl and lauryl alcohols and various isomers and in some cases have separated the dixanthogens of these alcohols. Using potassium ethyl xanthate as a typical reagent, the following procedures were followed, producing the same compounds by the three methods.

*Method 1.*—Twenty five grams of cuprous chloride were mixed into 1 l. of water, about 10 cc. of concentrated HCl added and heated to boiling and then cooled. A solution of 40 g. of potassium ethyl xanthate in 200 cc. water was then added with stirring. The reaction mixture was then heated on the steam bath for 1 hour, cooled, the precipitate filtered off and washed several times with water, and then dried in air. The product was a bright yellow finely divided powder. Its copper content agreed closely with that required theoretically for cuprous ethyl xanthate.

*Method 2.*—Fifty grams of copper sulfate ($CuSO_4.5H_2O$) were dissolved in 1 l. of water and to this was added a solution of 70 g. of potassium ethyl xanthate. A dark brown precipitate was first formed and when the reaction mixture was heated on the steam bath for one hour it was converted to a bright yellow precipitate similar to that obtained by Method 1. The precipitate was filtered off, washed several times with water and then extracted with acetone and the insoluble copper salt filtered off. This compound had a copper content agreeing closely with that required theoretically for cuprous ethyl xanthate. The acetone extract was evaporated, leaving a heavy viscous oily liquid, diethyl xanthogen.

*Method 3.*—Fifty grams of copper sulfate ($CuSO_4.5H_2O$) was dissolved in 1 l. of water and to this was added 42 g. of sodium acid sulfite ($NaHSO_3$). The blue color of the cupric solution changes to the characteristic green color of cuprous solutions. A solution of 70 g. of potassium ethyl xanthate was then added with stirring and a bright yellow precipitate formed. The reaction mixture is heated for one hour on the steam bath, cooled and filtered and the precipitate washed several times with water and dried. The compound had a copper content agreeing closely with that required theoretically for cuprous ethyl xanthate.

Using Method 2 the following examples are given of the formation of the copper salts of xanthic acids formed from other alcohols of the series having the formula $C_NH_{2N+2}O$.

*Copper methyl xanthate.*—Eighty-five grams of potassium methyl xanthate were added to a solution of 40 g. of copper sulfate ($CuSO_4.5H_2O$) in 1 l. of water. A brownish yellow precipitate formed which soon changes to almost red. After filtration and washing a red rubbery mass was obtained. This was extracted with acetone and filtered, and a reddish insoluble material remained. After drying this material was analyzed and found to have a copper content agreeing closely with that required, theoretically, for cuprous methyl xanthate. The acetone extract was evaporated on the steam bath and an oily liquid, dimethyl xanthogen, remained.

*Copper n-propyl xanthate.*—Fifty five grams of potassium n-propyl xanthate were added to a solution of 50 g. of copper sulfate ($CuSO_4.5H_2O$) in 1 l. of water. A brownish precipitate formed which was converted to a yellow color by heating on the steam bath for 1 hour. It was then filtered, washed several times with water and then extracted with acetone and filtered. The insoluble material was filtered off, dried, and on analysis found to have a copper content agreeing closely with that required theoretically for cuprous propyl xanthate. The acetone extract was evaporated on the steam bath leaving an oily liquid, dipropyl xanthogen, insoluble in water.

*Copper iso amyl xanthate.*—Fifty grams of potassium isoamyl xanthate were added to a solution of 28 g. of copper sulfate ($CuSO_4.5H_2O$) in 1 l. of water. A brownish precipitate formed which is converted to a bright yellow color after heating for one hour on a steam bath. The insoluble material was filtered off, washed several times with water and then extracted with acetone. The insoluble material was filtered off, washed, dried and on analysis found to have a copper content agreeing closely with that required, theoretically, for cuprous amyl xanthate. The acetone extract was evaporated on the steam bath leaving an oily liquid, diamyl xanthogen, insoluble in water.

The copper salts of all these xanthic acids are yellow, finely divided powders insoluble in water and stable under atmospheric conditions. The dixanthogens are heavy oily liquids.

The copper xanthate powders are not readily wetted by water and tend to float on the surface. However, the copper xanthates may be wetted and suspended in water by the use of wetting agents. One gram of cuprous ethyl xanthate made into a paste with 2 cc. of ethyl alcohol formed a fine homogeneous suspension when poured into 100 cc. of water. Likewise the other cuprous xanthates can be wetted by the use of alcohol but the same alcohol as that from which the xanthate was made should be used to avoid reactions. Obviously this method is not applicable in the case of insoluble alcohols. Other wetting agents may be used. For instance 1 g. of cuprous ethyl xanthate made a fine homogeneous suspension in 100 cc. of water containing five tenths of a gram of a soluble fish oil soap. Other commercial organic wetting agents may be used. In several experiments 1 g. samples of cuprous ethyl xanthate made fine homogeneous suspension in 100 cc. volumes of water to which had been added ½ g. of each of several commercial organic wetting agents. The mixtures containing cuprous xanthates and the dialkyl xanthogens formed by the above-described reactions can also be wetted and dispersed in water in suitable condition for spraying by the use of wetting agents such as neutral fish oil soap or commercial wetting agents in the same manner as the cuprous xanthate alone. It is not intended in this disclosure to specify the definite proportions in which these materials are most efficient but only to point out that the copper xanthates can be wetted and brought into suitable condition for application by spraying. In this condition they can be readily applied to plant and insect surfaces. Also these materials are stable, finely divided powders and may be mixed dry with lime, diatomaceous earth, kieselguhr and other diluents and applied as dusts.

This procedure for making these compounds for insecticidal and fungicidal use is an improvement over those now employed in the art for this purpose. It is more economical than making the two separately and then mixing them in this ratio as less labor is required. The cheaper and more soluble cupric salts may be utilized. The two compounds are more intimately mixed than in a mere mechanical mixture without excessive grinding.

In laboratory tests copper xanthates prepared from methyl, ethyl, propyl, butyl, amyl and lauryl alcohols, and some of their isomers when wetted and applied at the rate of 1 lb. to 50 gallons of water were found to be toxic to the conidia of *Sclerotinia fructicola* (peach brown rot organism) and *Glomerella cingulata* (apple bitter rot organism). Field tests have also been conducted with these materials to determine their phytocidal properties. Sprays made from these copper xanthates at the rate of 1 lb. to 50 gal., using a soluble fish oil soap as a wetter were applied to the foliage of apple, pear, lilac and peach. After several weeks' exposure no burn was evident on apple, pear or lilac but slight injury was evident on peach foliage. Tests were also made against these fungous diseases with the mixtures containing the cuprous xanthates and the dialkyl xanthogens in the molecular ratio of 2:1; or in other words the insoluble products resulting from the reactions of 2 mols of cupric sulfate with 4 mols of alkali metal xanthate. These mixtures also had fungicidal activity. Insecticidal tests were made with the cuprous xanthates and with the mixtures containing cuprous xanthate and dialkyl xanthogen against several species of insects. The mixtures showed greater insecticidal activity than the separate components. Good results in particular were obtained with the mixtures against the tobacco hornworm, the Southern army worm, the cross striped cabbage worm and the imported cabbage worm.

Having thus described my invention, I claim:

1. The composition of an insecticide with a compatible fungicide, said composition comprising a cuprous xanthate as its essential active fungicidal ingredient and a lower di alkyl xanthogen as its essential active insecticidal ingredient, in the approximate molecular ratio of two to one respectively.

2. The composition of a fungicide with a compatible insecticide, said composition comprising cuprous methyl xanthate as its essential active fungicidal ingredient and di methyl xanthogen as its essential active insecticidal ingredient, in the approximate molecular ratio of two to one respectively.

3. The composition of a fungicide with a compatible insecticide, said composition comprising cuprous propyl xanthate as its essential active fungicidal ingredient and di propyl xanthogen as its essential active insecticidal ingredient, in the approximate molecular ratio of two to one respectively.

4. The composition of a fungicide with a compatible insecticide, said composition comprising cuprous amyl xanthate as its essential active fungicidal ingredient and di amyl xanthogen as its essential active insecticidal ingredient, in the approximate molecular ratio of two to one respectively.

ROSCOE H. CARTER.